(12) United States Patent
Lange et al.

(10) Patent No.: US 7,244,870 B2
(45) Date of Patent: Jul. 17, 2007

(54) METHOD FOR PRODUCING POLYISOBUTENES

(75) Inventors: Arno Lange, Bad Dürkheim (DE); Hans Peter Rath, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 497 days.

(21) Appl. No.: 10/433,439

(22) PCT Filed: Dec. 11, 2001

(86) PCT No.: PCT/EP01/14545

§ 371 (c)(1),
(2), (4) Date: Jun. 4, 2003

(87) PCT Pub. No.: WO02/48215

PCT Pub. Date: Jun. 20, 2002

(65) Prior Publication Data

US 2004/0015029 A1  Jan. 22, 2004

(30) Foreign Application Priority Data

Dec. 12, 2000  (DE) ................................ 100 61 727

(51) Int. Cl.
   *C07C 2/02* (2006.01)
   *C08C 4/00* (2006.01)
(52) U.S. Cl. ...................... 585/530; 585/520; 585/525; 526/237; 526/348.7
(58) Field of Classification Search ................ 585/520, 585/521, 524, 525, 530; 526/237, 348.7
   See application file for complete search history.

(56) References Cited

U.S. PATENT DOCUMENTS

| | | | |
|---|---|---|---|
| 4,152,499 A | 5/1979 | Boerzel et al. | |
| 4,276,394 A | 6/1981 | Kennedy et al. | |
| 4,316,973 A | 2/1982 | Kennedy | |
| 4,524,188 A | 6/1985 | Kennedy et al. | |
| 4,605,808 A | 8/1986 | Samson | |
| 5,286,823 A | 2/1994 | Rath | |
| 5,910,550 A | 6/1999 | Rath | |
| 6,407,186 B1 | 6/2002 | Rath | |

FOREIGN PATENT DOCUMENTS

| | | |
|---|---|---|
| EP | 206 756 | 12/1986 |
| EP | 279 456 | 8/1988 |
| EP | 558 187 | 9/1993 |
| EP | 652 253 | 5/1995 |
| EP | 671 419 | 9/1995 |
| EP | 713 883 | 5/1996 |

OTHER PUBLICATIONS

Derwent Abst. 92-133629/17 (1992).
Carbocationix Mac.Engineering, Kennedy et al.60-71 (1992).
2001-258855/27 Derwent Abst.

*Primary Examiner*—Glenn Caldarola
*Assistant Examiner*—In Suk Bullock
(74) *Attorney, Agent, or Firm*—Novak Druce & Quigg, LLP

(57) ABSTRACT

Polyisobutenes in which at least 60 mol % of the polymer chains have at least one olefinically unsaturated terminal group are prepared by cationic polymerization of isobutene or isobutene-containing monomer mixtures in the condensed phase by a process in which the polymerization is carried out in the presence of an initiator system comprising
i) a Lewis acid selected from covalent metal chlorides and semimetal chlorides and
ii) at least one organic compound I having at least one functional group FG which forms a carbocation or a cationic complex with the Lewis acid under the polymerization conditions, where FG is selected from acyloxy, alkoxy and halogen, which are bonded to a secondary or tertiary carbon atom or to an allylic or a benzylic carbon atom,
in a solvent inert toward the Lewis acid, the Lewis acid being used in less than the stoichiometric amount, based on the functional groups FG.

17 Claims, No Drawings

METHOD FOR PRODUCING POLYISOBUTENES

The present invention relates to a process for the preparation of polyisobutenes in which at least 60 mol % of the polymer chains have at least one olefinically unsaturated terminal group.

Polyisobutenes having a high content of olefinically unsaturated terminal groups are important starting materials for the preparation of modern fuel and lubricant additives having a detergent effect. The olefinically unsaturated terminal groups in these hydrocarbon polymers are used for introducing the polar terminal groups customary for this type of additive.

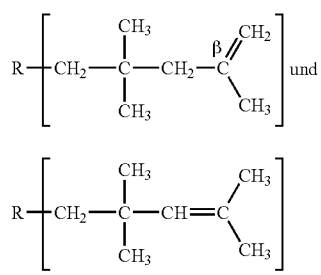

The preparation of olefin-terminated polyisobutenes is carried out as a rule by cationic polymerization of isobutene or isobutene-containing hydrocarbon streams in the presence of boron trifluoride complex catalysts. Processes for this purpose are comprehensively described in the prior art (cf. for example DE-A 27 02 604, EP-A 145 235, EP-A 481 297, EP 671 419, EP-A 628 575, EP-A 807 641 and WO 99/31151).

The polyisobutenes prepared in this manner have a high content of olefinically unsaturated terminal groups, in particular terminal groups of the formula (A). The width of the molecular weight distribution is, however, not always satisfactory for modern fuel additives. Although it is possible to obtain polyisobutenes having a narrower molecular weight distribution from the polymerization products of these reactions, for example by purification of the polymerization products, these measures are too expensive for commercial use.

In U.S. Pat. No. 4,316,973, Kennedy describes a process for the preparation of telechelic polyisobutenes having olefinically unsaturated terminal groups, comprising the basic elimination of the corresponding halogen-terminated telechelic polyisobutenes. Their preparation is effected by reacting isobutene in the presence of a Lewis acid and a benzyl halide or an alkyl halide. However, this two-stage procedure appears unsuitable for economical preparation of olefin-terminated polyisobutenes. Similar polymerization processes are disclosed in EP-A 206 756, U.S. Pat. No. 4,276,394 and U.S. Pat. No. 4,524,188.

The polymerization of isoolefins or vinylaromatics in the presence of metal or semimetal halides as Lewis acid catalysts and tert-alkyl halides or benzyl or allyl halides, esters or ethers as initiators is also referred to as living cationic polymerization. A comprehensive overview thereof is to be found in Kennedy/Ivan, Carbocationic Macromolecular Engineering, Hauser Publishers 1992.

There, and in the abovementioned publications, the Lewis acid is always used in a molar excess, based on the initiator molecule (cf. also Kennedy/Ivan loc. cit., page 67).

For example, boron trichloride is used as a Lewis acid in the polymerization of isobutene in 10 times the molar amount (loc. cit., page 62) and titanium(IV) chloride even in more than a 20-fold molar excess, based on the initiator compound. The concentrations of Lewis acid are therefore very high. Under these conditions, halogen-terminated polyisobutenes were regularly prepared.

EP-A 279 456 describes the preparation of halogen- or acyloxy-terminated polyisobutenes by reacting isobutene in the presence of Lewis acids, alkyl halides or alkyl esters of carboxylic acids as initiators and organonitro compounds as cosolvents. However, the use of organonitro compounds is expensive.

The prior German Patent Application P 199 37 562.3 describes the preparation of block copolymers by what is termed living cationic polymerization. Initiators used are Lewis acids and alkyl halides.

It is an object of the present invention to provide a process for the preparation of polyisobutenes having a high content of olefinically unsaturated terminal groups and a narrow molecular weight distribution, which process can be carried out in a simple manner.

We have found that this object is achieved, surprisingly, by a process for the cationic polymerization of isobutene or isobutene-containing monomer mixtures, in which the polymerization is carried out in the presence of an initiator system comprising a covalent metal or semimetal chloride as the Lewis acid and at least one organic compound I having at least one functional group FG which forms a carbocation or an ion pair with the Lewis acid under the polymerization conditions, in a solvent inert toward the Lewis acid.

The present invention thus relates to a process for the preparation of polyisobutenes in which at least 60 mol % of the polymer chains have at least one olefinically unsaturated terminal group, by cationic polymerization of isobutene or isobutene-containing monomer mixtures in the condensed phase, wherein the polymerization is carried out in the presence of an initiator system comprising i) a Lewis acid selected from covalent metal chlorides and semimetal chlorides, and ii) at least one organic compound I having at least one functional group FG which forms a carbocation or a cationic complex with the Lewis acid under the polymerization conditions, where FG is selected from acyloxy, alkoxy and halogen, which are bonded to a secondary or tertiary carbon atom or to an allylic or a benzylic carbon atom, in a solvent inert toward the Lewis acid, the Lewis acid being used in less than the stoichiometric amount, based on the functional groups FG.

In the context of the present invention, polyisobutenes are understood as meaning both the homopolymers of isobutene and the copolymers which are predominantly composed of polymerized isobutene units, preferably to an extent of more than 80, in particular more than 90, particularly preferably more than 95, % by weight. According to the invention, either pure isobutene or monomer mixtures which contain at least 80, in particular at least 90, particularly preferably at least 95, % by weight of isobutene and less than 20, preferably less than 10, in particular less than 5, % by weight of monomers copolymerizable with isobutene under the conditions of cationic polymerization are accordingly used.

Suitable copolymerizable monomers are vinylaromatics, such as styrene and α-methylstyrene, $C_1$-$C_4$-alkylstyrenes, such as 2-, 3- and 4-methylstyrene, and 4-tert-butylstyrene, isoolefins of 5 to 10 carbon atoms, such as 2-methylbut-1-ene, 2-methylpent-1-ene, 2-methylhex-1-ene, 2-ethylpent-1-ene, 2-ethylhex-1-ene and 2-propylhept-1-ene. Further suitable comonomers are olefins which have a silyl group, such as 1-trimethoxysilylethene, 1-(trimethoxysilyl)propene, 1-(trimethoxysilyl)2-methylprop-2-ene, 1-[tri(methoxyethoxy)silyl]ethene, 1-[tri(methoxythoxy)silyl]propene and 1-[tri(methoxyethoxy)silyl]-2-methylprop-2-ene.

In view of the desired use of the polyisobutenes obtained in the novel process as fuel or lubricant additives the isobutene is preferably used in the absence of the abovementioned comonomers.

A particularly suitable isobutene feedstock for the novel process is isobutene. Isobutene-containing $C_4$-hydrocarbon streams, for example refined $C_4$ fractions, $C_4$ cuts from isobutene dehydrogenation, $C_4$ cuts from steam crackers or FCC crackers (FCC: fluid catalysed cracking) can also be used if they have been substantially freed from 1,3-butadiene contained therein. $C_4$-Hydrocarbon streams suitable according to the invention contain, as a rule, less than 500 ppm, preferably less than 200 ppm, of butadiene. When $C_4$ cuts are used as starting material, the hydrocarbons other than isobutene play the role of an inert solvent.

In the novel process, the polymerization of the isobutene is initiated by the initiator system comprising titanium tetrachloride as the Lewis acid and at least one organic compound I. It is assumed that the Lewis acid forms, with the compound I, a carbocation or at least an ionic complex which interacts with the olefinically unsaturated double bond of the isobutene and thus produces a positive (partial) charge on the tertiary carbon atom of the isobutene. This in turn interacts with a further isobutene molecule with continuation of the polymerization reaction. Suitable compounds I are therefore all those compounds which are known to form a carbocation or at least an anionic complex with Lewis acids.

The terms carbocation and cationic complex are not strictly separated from one another but include all intermediate stages of solvent-separated ions, solvent-separated ion pairs, contact ion pairs and strongly polarized complexes having a positive partial charge on a carbon atom of the compound I. It is assumed that, under the reaction conditions, in particular with the use of nonpolar solvents as the reaction medium, (contact) ion pairs, for example of the formula

where $R^{\oplus}$ is the carbocation, i.e. the organic radical which carries the positive charge, form.

Examples of suitable Lewis acids are the (semi)metal chlorides $BCl_3$, $TiCl_4$, $VCl_5$, $SnCl_4$ or $FeCl_3$. Preferred (semi)metal chlorides are $BCl_3$ and in particular $TiCl_4$.

All organic compounds which have at least one nucleophilically displaceable leaving group X and which can stabilize a positive charge or partial charge on the carbon atom which carries the leaving group X are in principle suitable as compounds of the formula I. These are known to include compounds which have at least one leaving group X which is bonded to a secondary or tertiary aliphatic carbon atom or to an allylic or benzylic carbon atom. According to the invention, suitable leaving groups are halogen, $C_1$-$C_6$-alkoxy and $C_1$-$C_6$-alkylcarbonyloxy.

Here, halogen is in particular chlorine, bromine or iodine, especially chlorine. $C_1$-$C_6$-Alkoxy may be either linear or branched and is, for example, methoxy, ethoxy, n-propoxy, isopropoxy, n-butoxy, isobutoxy, n-pentyloxy and n-hexyloxy, in particular methoxy. $C_1$-$C_6$-Alkylcarbonyloxy is, for example, acetoxy, propionyloxy, n-butyroxy and isobutyroxy, in particular acetoxy.

Preferred compounds of the formula I are those in which the functional group is of the formula FG

where

X is selected from halogen, $C_1$-$C_6$-alkoxy and $C_1$-$C_6$-acyloxy, $R^1$ is hydrogen or methyl and $R^2$ is methyl or forms a $C_5$- or $C_6$-cycloalkyl ring with $R^1$ or with the moiety to which the functional group FG is bonded, and $R^2$ may also be hydrogen if the functional group FG is bonded to an aromatic or olefinically unsaturated carbon atom.

The compounds of the formula I preferably have one, two, three or four, in particular one or two, functional groups FG, particularly preferably one functional group FG. X in the formula (FG) is preferably halogen, in particular chlorine.

Preferred compounds I are, for example, of the formulae I-A to I-D:

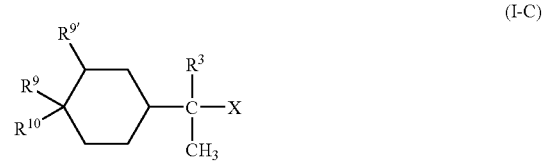

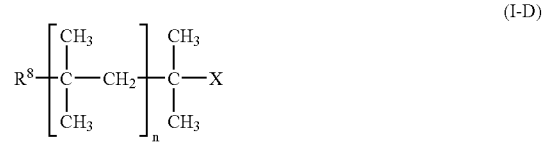

where X has the abovementioned meanings, n is 0, 1, 2, 3, 4 or 5, $R^3$, $R^4$ and $R^{10}$, independently of one another, are each hydrogen or methyl, $R^5$, $R^6$ and $R^7$, independently of one another, are each hydrogen, $C_1$-$C_4$-alkyl or group $CR^3R^4$—X, where $R^3$, $R^4$ and X have the abovementioned meaning, and $R^8$ is hydrogen, methyl or a group X and $R^9$ and $R^{9'}$ are each hydrogen or a group X.

In the formulae I-A to I-X, $R^3$ and $R^4$ are preferably both methyl. In the formula I-A, $R^6$ is, for example, a group $CR^3R^4$—X which is arranged para to the $CR^3R^4X$ group if $R^5$ is hydrogen. It may also be in the meta position if $R^5$ is $C_1$-$C_4$-alkyl or is a group $CR^3R^4$—X. Preferred compounds I-A are, for example, 2-chloro-2-phenylpropane and 1,4-bis (2-chloroprop-2-yl)benzene.

In the formula I-B, $R^7$ is preferably a group $CR^3R^4$—X or hydrogen. Examples of compounds of the formula I-B are allyl chloride, methallyl chloride, 2-chloro-2-methylbut-2-ene and 2,5-dichloro-2,5-dimethylhex-3-ene.

In the compounds I-C, $R^3$ is preferably methyl. $R^2$ is preferably likewise methyl. $R^9$ is preferably a group X, in particular halogen, especially if $R^{10}$ is methyl. Examples of compounds of the formula I-C are 1,8-dichloro-4-p-menthane (limonene dihydrochloride), 1,8-dibromo-4-p-menthane (limonene dihydrobromide), 1-(1-chloroethyl-3-chlorocyclohexan, 1-(1-chloroethyl)-4-chlorocyclohexane, 1-(1-bromoethyl)-3-bromocyclohexane and 1-(1-bromoethyl)-4-bromocyclohexane.

Preferred among the compounds of the formula I-D are those in which $R^8$ is methyl. Other preferred compounds of the formula I-D are those in which $R^8$ is a group X, in particular halogen, if n is >0.

In view of the use of the polyisobutenes prepared by the novel process as fuel or lubricant additives, preferred among the compounds I are the compounds of the formula I-D, and among these in particular those in which X is halogen. In the formula I-D, n is preferably 1, 2, 3 or 4, in particular 1 or 2.

The use of the compounds of the formula I-C as an assistant (initiator) for the cationic polymerization is novel and likewise forms a subject of the present invention. Compounds I-C, together with Lewis acids, preferably the abovementioned metal chlorides in particular $TiCl_4$ or $BCl_3$, and, if required, compounds II, serve as initiators. They are suitable in particular for the homopolymerization and copolymerization of isobutene, if required with suitable comonomers, and for the block copolymerization of isobutene with, for example, vinylaromatic monomers, by the prior art process or by the novel process.

The compounds I-C can be prepared in a smooth reaction from the compounds of the formula III

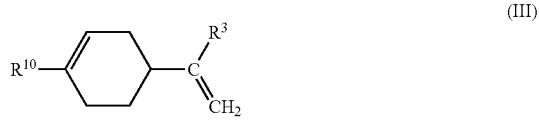

(III)

where $R^3$ and $R^{10}$ have the abovementioned meanings, by reaction with compounds H—X by known processes. A description of their preparation is given, for example, by Carman et al. in Aust. J. Chem. 22, 1969, 2651-2656. Here, X has the abovementioned meanings. In particular, the compounds of the formula I-B, where X is halogen, are prepared by reaction with hydrogen halide, preferably in anhydrous form, in particular by reaction with gaseous HCl or HBr. The reaction with hydrogen halide is preferably effected in an inert organic solvent, such as a hydrocarbon, a halohydrocarbon, an ether, an organic carboxylic acid, such as formic, acetic or propionic acid, or mixtures of these solvents.

Compounds of the formula I-C where X is halogen can also be reacted by known processes with $C_1$-$C_6$-alkanols or $C_1$-$C_6$-alkanecarboxylic acids to give compounds I-C in which X is $C_1$-$C_6$-alkoxy or $C_1$-$C_6$-acyloxy. The compounds of the formula I-C can of course be used not only in the novel process but in other processes of the prior art for the cationic polymerization of olefins together with Lewis acids.

As a rule, the compound I is used in the novel process in an amount of at least $10^{-6}$ mol per mol of isobutene or polymerizable monomers, in order to provide a sufficient concentration of initiator complexes. As a rule, the amount of the compounds I will not exceed 1 mol per mol of monomers to be polymerized (or isobutene). Unless stated otherwise, these and the data given below with respect to the amounts of the compound I are always based on the number of functional groups (FG) in the compound I. The compounds of the formula I are preferably used in an amount of from $10^{-5}$ to $10^{-1}$, in particular from $10^{-4}$ to $5\times 10^{-2}$, mol, based on the functional groups (FG) of the compound I, per mol of isobutene or polymerizable monomers. Here, it must be borne in mind that the resulting molecular weight of the polyisobutene prepared by the novel process depends on the amount of compound I in such a way that the molecular weight of the polyisobutene decreases with increasing concentration of the compound I.

In the novel process, the Lewis acid is of course used in an amount which is sufficient for the formation of the initiator complex. This is, as a rule, ensured even at low concentrations of the Lewis acid in the reaction medium, as a rule at least 0.01 mol/l. The Lewis acid in the reaction medium will therefore generally not exceed a concentration of 0.3 mol/l. In particular, the concentration is from 0.02 to 0.2, particularly preferably from 0.03 to 0.15, mol/l. According to the invention, the molar ratio of the metal halide having Lewis acid properties to the functional groups FG of the compound I is below 1:1, e.g. from 0.01:1 to <1:1; in particular from 0.02:1 to 0.8:1. As a rule, boron trichloride is used in a lower molar ratio of, preferably, from 0.02 to 0.1 mol per mol of functional groups FG and titanium(IV) chloride in slightly higher molar ratios, e.g. from 0.1 to <1, preferably from 0.1 to 0.8, mol per mol of functional group FG.

In addition to the compounds I, the initiator system preferably comprises at least one further aprotic polar compound II which is suitable for complex formation with the Lewis acid or with the carbocation or ionic complex of Lewis acid and compound I, which carbocation or ionic complex is formed under the reaction conditions. These are Lewis bases (electron donors) which have at least one free electron pair on a hetero atom, for example an oxygen, nitrogen, phosphorus or sulfur atom.

Examples of such compounds are compounds having ether groups, such as di-$C_1$-$C_{10}$-alkyl ethers having primary or secondary alkyl groups, e.g. diethyl ether or diisopropyl ether, cyclic ethers, such as tetrahydrofuran or dioxane, tertiary amines, e.g. trialkylamines, such as triethylamine, tertiary amides, such as dimethylacetamide or N-methylpyrrolidone, esters of aliphatic or aromatic carboxylic acids with primary alcohols, such as ethyl acetate and ethyl propionate, compounds having thioether groups, e.g. dialkyl thioethers having primary or secondary alkyl groups, alkyl aryl thioethers having primary or secondary alkyl groups, such as methyl phenyl sulfide, dialkyl sulfoxides, such as dimethyl sulfoxide, aliphatic and aromatic nitriles, such as acetonitrile, propionitrile and benzonitrile, tertiary phosphines, such as trimethylphosphine, triphenylphosphine or tricyclohexylphosphine. Preferred compounds II are pyridine and pyridine derivatives, in particular alkylpyridines. Examples of alkylpyridines in addition to the picolines are pyridines having a sterically shielded nitrogen atom, such as 2,6-di-tert-butylpyridine. The latter act as proton scavengers and in this way prevent an uncontrolled polymerization not according to the invention from being initiated by ubiquitous traces of water.

As a rule, the compound II is used in an amount such that the molar ratio of compound II to compound I is from 10:1 to 1:20, based on the functional groups (FG) of the compound I.

As a rule, the novel process is carried out at below 0° C., e.g. from 0 to −140° C., preferably from −30 to −120° C., particularly preferably from −40 to −110° C. The reaction pressure is of minor importance and depends in a known manner on the apparatuses used and other reaction conditions.

Suitable solvents are in principle all organic compounds which differ from the compounds I and II and the polymerizable monomers, in particular isobutene, and which have no abstractable protons. Preferred solvents are hydrocarbons and halohydrocarbons. Particularly preferred solvents are acyclic alkanes of 2 to 8, preferably 3 to 6, carbon atoms, such as ethane, isopropane, n-propane, n-butane and its isomers, n-pentane and its isomers, n-hexane and its isomers and n-heptane and its isomers, cyclic alkanes of 5 to 8 carbon atoms, such as cyclopentane, cyclohexane and cycloheptane, acyclic alkenes of, preferably, 2 to 8 carbon atoms, such as ethene, isopropene, n-propene, n-butene, n-pentene, n-hexene and n-heptene, cyclic olefins, such as cyclopentene, cyclohexene and cycloheptene, halogenated alkanes having 1 to 5 carbon atoms and 1, 2, 3, 4, 5 or 6 halogen atoms, selected from fluorine, chlorine or bromine, in particular chlorine, such as methyl chloride, methyl bromide, dichloromethane, trichloromethane, dibromomethane, ethyl chloride, ethyl bromide, 1,2-dichloroethane and 1,1,1-trichloroethane, and chloroform.

Not only solvents as such but also mixtures of these solvents are suitable. Mixtures are preferred particularly when the solvent has a melting point above the desired polymerization temperature.

Solvents and solvent mixtures which comprise at least one cyclic or alicyclic alkane and/or one α-olefin are very particularly preferred. Particularly preferred among these are solvent mixtures which comprise at least one unhalogenated hydrocarbon and at least one halogenated, preferably chlorinated, hydrocarbon, preferably an aliphatic or cycloaliphatic alkane, and a chlorinated hydrocarbon. Of course, the chlorinated hydrocarbons do not include any compounds in which chlorine atoms are attached to secondary or tertiary carbon atoms.

Of course, the polymerization is carried out under substantially aprotic, in particular anhydrous, reaction conditions. Aprotic anhydrous reaction conditions are understood as meaning that the water content (or content of protic impurities) in the reaction mixture is less than 50 ppm, in particular less than 5 ppm. As a rule, the feedstocks are therefore dried physically and/or by chemical measures before they are used. It has proven particularly useful if, after conventional preliminary purification and preliminary drying, the aliphatic or cycloaliphatic hydrocarbons preferably used as solvents are mixed with an organometallic compound, for example an organolithium, organomagnesium or organoaluminum compound, in an amount which is sufficient to remove the traces of water from the solvent. The solvent treated in this manner is then condensed directly into the reaction vessel. It is also possible to proceed in a similar manner with the monomers to be polymerized, in particular the isobutene or mixtures of isobutene and compound II.

The preliminary purification or preliminary drying of solvents and of the isobutene is carried out in a conventional manner, preferably by treatment with solid drying agents, such as molecular sieves, or predried oxides, such as calcium oxide or barium oxide. The feedstocks for which a treatment with metal alkyls is not suitable, for example the alkyl halides used as solvents, and the compounds I, can be dried in an analogous manner.

The polymerization of the isobutene or of the isobutene-containing starting material takes place spontaneously on mixing the initiator system mixed according to the invention with the isobutene or the isobutene-containing starting material in the inert organic solvent at the desired reaction temperature. Here, it is possible to adopt the procedure in which isobutene is initially taken in the inert solvent and cooled to the reaction temperature and the initiator system is then added. In another possible procedure, the initiator system is initially taken in the solvent and then the isobutene or the isobutene-containing feedstock is added. In addition, a portion or the total amount of isobutene or of the isobutene-containing feedstock can be initially taken in the solvent and the initiator system then added. The remaining amounts of isobutene or isobutene-containing feedstock are then added in the course of the reaction, for example at a rate at which they are consumed. In the case of the addition of the initiator system, as a rule the components of the initiator system are added separately. In the batchwise procedure described here, as a rule first the compound I and, if required, the compound II and then the Lewis acid are added. The time of addition of the initiator is then considered to be the time when both components of the initiator system are contained in the reaction vessel. For example, it is possible to initially take first the solvent, then the compound I and, if required, the Lewis base II and then a portion or the total amount of the isobutene or of the isobutene-containing feedstock, to start the polymerization by adding the Lewis acid and then, if required, to add any residual amounts of isobutene or isobutene-containing feedstock to the polymerization. However, it is also possible initially to take first the solvent, then the Lewis acid and a portion or the total amount of the isobutene or of the isobutene-containing feedstock and then to initiate the polymerization by adding the compound I and, if required, the compound II.

In addition to the batchwise procedure described here, the polymerization can also be designed as a continuous process. Here, the feedstocks, i.e. the monomers to be polymerized, the solvent and the initiator system are fed continuously to the polymerization reaction and reaction product is removed continuously so that more or less steady-state polymerization conditions are established in the reactor. The components of the initiator system may be fed in either separately or together, preferably diluted in the solvent. The isobutene to be polymerized or the isobutene-containing monomer mixture can be fed in as such, diluted with a solvent or as an isobutene-containing hydrocarbon stream.

The removal of the heat of reaction in the batchwise as well as in the continuous reaction is effected in a conventional manner, for example by means of internally installed heat exchangers and/or by cooling the wall and/or with the use of evaporative cooling. The use of ethene and/or mixtures of ethene with other hydrocarbons and/or halohydrocarbons as solvents has proven particularly useful here since ethene is not only economical but also has a boiling point in the desired polymerization temperature range.

Suitable reaction vessels for carrying out the novel process are in principle all reactors as usually used in a cationic polymerization of isobutene, for example a cationic polymerization of isobutene with boron trifluoride-oxygen complexes. To this extent, reference is made here to the relevant prior art. In the batchwise reaction, the stirred kettles which are customary for this purpose and are preferably equipped with evaporative cooling, suitable mixers, feeds, heat exchanger elements and blanketing apparatuses are suitable. The continuous reaction can be carried out in the reaction kettles, reaction cascades, tubular reactors or tube-bundle reactors customary for this purpose, in particular circular tubular and tube-bundle reactors, which are preferably equipped in the manner described above for stirred kettles.

In order to isolate the isobutenes from the reaction mixture, the latter is deactivated after the polymerization in the manner customary for cationic polymerization reactions, preferably by adding a protic compound, in particular by adding alcohols, such as methanol, ethanol, n-propanol, isopropanol, n-butanol, isobutanol, sec-butanol or tert-butanol, or mixtures thereof with water. The substances used for the deactivation are preferably employed in a diluent, for example one of the solvents, in order to avoid an undesired increase in viscosity. Here too, reference may be made to the prior art, cited at the outset, on the polymerization of boron trifluoride with isobutene, whose working-up measures can be applied in an analogous manner to the novel process. Preferably, the composition used for the deactivation or mixture thereof is cooled to the polymerization temperature with an inert solvent before the deactivation in order to avoid undesired secondary reactions.

As a rule, the solvents are then removed in suitable units, for example in rotary, falling-film or thin-film evaporators, or by flash evaporation (letting down of the reaction solution downstream of a heat exchanger into pipelines or through a perforated plate/die plate). As a rule, reduced pressure, for example from 0.1 to 800, preferably from 1 to 100, mbar, is applied for removing the solvent. The bottom temperature is preferably from 50° C. to 250° C., in particular from 150° C. to 230° C. The use of higher temperatures, for example above 150° C., in particular 170° C. or higher, leads to a further reduction in the residual chlorine contents and hence to a higher proportion of terminal double bonds in the reaction product.

Polyisobutenes having a high content of olefinically unsaturated terminal groups of the formula I can be prepared by the novel process. The terminal group content is preferably at least 80, in particular at least 90, particularly preferably at least 95, mol %, based on the polymer chains. Since the compounds I used for initiating the polymerization likewise form a terminus of the polymer chain, they too may have an olefinically unsaturated terminal group, for example when compounds I-C, such as allyl chloride or methallyl chloride, are used. The percentages of double bonds stated here therefore relate to the double bonds at the other terminus of the polymer chain and do not include the double bonds introduced by the use of the compound I.

The molecular weight of the polymers obtainable by the novel process is as a rule from 400 to 400 000, preferably from 500 to 200 000, particlularly preferably from 700 to 100 000, Dalton (number average molecular weight $M_n$). The polyisobutenes obtainable by the novel process moreover have a narrow molecular weight distribution which is characterized by dispersity $D=M_w/M_n$ of less than 3, preferably less than 1.8, in particular less than 1.6, for example from 1.05 to 1.6. Here, $M_w$ is the weight average molecular weight.

All data relating to molecular weights are based on values as obtained by means of gel permeation chromatography (GPC). The gel permeation chromatography was carried out using THF as the mobile phase and $CS_2$ as a reference on two columns connected in series (1 300 mm, d 7.8 mm), the first column being packed with Styragel HR5 (molecular weight range from 50 000 to $4 \times 10^6$) and the second column with Styragel HR3 (molecular weight range from 200 to 30 000) from Waters. The detection was carried out using a differential refractometer. Commercial polyisobutene standards in the molar mass range from 224 to 1 000 000, from Polymer-Standards Service, Mainz, Germany, are used as standards for determining the isobutene block.

The examples which follow illustrate the inventions without restricting them.

I. Analysis

The molecular weight ($M_n$, $M_w$ and D) was determined in the manner described above, by means of GPC and/or by means of $^1$H-NMR spectroscopy. The double bond content was determined by means of $^1$H-NMR spectroscopy (integration of the vinylprotons against methyl and methylene protons) or via the chlorine content. The residual chlorine content was determined by elemental analysis.

II. Polymerization Process

EXAMPLE 1

A 1 l four-necked flask equipped with a dropping funnel (to which a dry ice condenser is attached), a thermometer, a septum, a magnetic stirrer and a further dropping funnel was dried by evacuation and flushing with dry nitrogen, these operations being carried out twice. Cooling was effected using a dry ice/acetone cooling bath, and 200 ml of hexane cooled to −78° C. were added. 1.7 g (9 mmol) of titanium tetrachloride were then added via the septum. Methyl chloride was dried over a 3 Å molecular sieve, condensed in the dropping funnel (200 ml) and added to the initially taken substance. Thereafter, 10.16 g (44 mmol) of 2-chloro-2-phenylpropane were added to the reaction vessel via the septum, followed in the course of 15 minutes by 110 ml of isobutane which had been dried over a 3 Å molecular sieve and was cooled to −78° C. An internal temperature of −50° C. in the reaction vessel was maintained by cooling, and stirring was continued at this temperature for 20 minutes. The mixture was heated to room temperature and 200 ml of hexane were added. Thereafter, 20 ml of isopropanol were added and the mixture was washed three times with water and dried over sodium sulfate, and solvent was stripped off up to the final pressure of 2 mbar and the final temperature of 220° C. in a rotary evaporator:

69.6 g of clear oil, $M_n$=1253 D, D=1.7; chlorine content 0.1 g/kg (theoretically for chlorine termination: 27.9 g/kg). Double bond content: >99 mol %.

EXAMPLE 2

In a repetition of the experiment, 120 ml of isobutene were used. (Samples were taken after 5, 10 and 15 minutes and were worked up (16 g altogether)).

After analogous working-up of the batch, 72 g of clear oil were obtained, $M_n$=1484 D, D=2.41; chlorine content 0.22 g/kg (theoretically for chlorine termination: 23.9 g/kg); double bond content: >99 mol %.

EXAMPLE 3

The reaction apparatus used was a 1 l four-necked flask which was equipped with a dry ice condenser, a thermometer, a septum, a magnetic stirrer and a further dropping funnel and had a direct connection to a 1 l condensation flask, which in turn was provided with a graduated dropping funnel with dry ice condenser. The apparatus was dried by evacuation and flushing with dry nitrogen, these operations being carried out twice.

The following were added to the condensation flask (cooled in an acetone/dry ice bath): 300 ml of n-hexane (dried using 3 Å molecular sieve at −78° C.) and 100 ml of isobutene (condensed at −78° C. and prepurified over alumina). A little phenanthroline was added and titration was carried out with n-butyllithium solution until the color changed to reddish brown. The amount of n-butyllithium solution consumed was again added. 144 g of precondensed methyl chloride was then added. The dry ice bath was replaced by a water bath. The content of the condensation flask was distilled over into the reaction flask (dry ice cooling in the bath and in the condenser).

At −50° C., 0.19 g of 2,6-di-tert-butylpyridine, 0.5 g of 2-chloro-2-phenylpropane and finally 0.51 g of titanium tetrachloride were added in succession via the septum. The internal temperature was kept at −50° C. by cooling. Stirring was then continued for 240 minutes at −50° C. 20 ml of isopropanol (precooled to −50° C.) were added and the mixture was washed three times with water. Thereafter, drying was carried out over sodium sulfate and solvent was stripped off up to the final pressure of 2 mbar and the final temperature of 220° C. in a rotary evaporator.

43 g of slightly cloudy oil, $M_n$=15595 D, D=1.43; $^1$H-NMR: vinylprotons at δ=5.2 ppm (endo double bond) and δ=4.8 and 4.65 ppm (exo double bond). A molecular weight of 16300 D was calculated from the ratio of vinyl to methyl and methylene protons.

Chlorine content 0.1 g/kg (theoretically for chlorine determination: 2.2 g/kg); double bond content >95 mol %.

EXAMPLE 4

Analogously to example 3, the following were initially reacted: 480 ml of hexane, 400 g of methyl chloride, 9.84 g of titanium tetrachloride, 0.56 g of 1,8-dichloro-4-p-menthane (limonene dihydrochloride), 0.3 g of 2,6-di-tert-butylpyridine and 0.4 g of pyridine. Working up was not carried out and instead 58.4 g of styrene were added after 4 hours at −50° C. After 1 hour at −50° C., 20 ml of isopropanol were added and the mixture was heated to room temperature. After washing with water, drying and evaporating down in a rotary evaporator at 220° C./2 mbar, the following was obtained:

87.4 g of colourless, opal, rubber-like material, $M_n$=40670 D, D=1.84.

Example 4 shows that limonene dihydrochloride is suitable as a coinitiator not only for the preparation of olefin-terminated polyisobutenes but also for the preparation of block copolymers in the context of a living cationic polymerization (cf. the prior German Patent Application 199 37 562.3).

EXAMPLES 5 TO 22

Examples 5 to 22 were carried out analogously to example 3. The feedstocks and process parameters are shown in table 1 and the properties of the polymers obtained are shown in table 2.

TABLE 1

| | | | Process parameters | | | | | | |
| | | | Feedstocks | | | | | | |
| Ex. | Isobutene [mol] | $CH_2Cl_2$ [ml] | Hexane [ml] | $TiCl_4$ [mmol] | Compound I Type | Compound I [mmol] | Compound II Type | Compound II [mmol] | T(max) [° C.] | D [min] |
|---|---|---|---|---|---|---|---|---|---|---|
| 5 | 4.3 | 300 | 300 | 26.4 | CPB | 48.4 | Pyridine | 6.3 | −50 | 60 |
| 6 | 4.3 | 400 | 200 | 13.2 | CPB | 48.6 | Pyridine | 6.2 | −45 | 60 |
| 7 | 4.3 | 400 | 200 | 13.2 | CPB | 48.4 | Pyridine | 6.3 | −50 | 60 |
| 8 | 4.3 | 300 | 300 | 26.4 | CPB | 48.4 | Pyridine | 6.3 | −55 | 60 |
| 9 | 3.2 | 200 | 200 | 32.0 | CPB | 100.0 | Pyridine | 38.0 | −38 | 120 |
| 10 | 3.2 | 400 | — | 40.0 | CPB | 100.0 | Pyridine | 38.0 | −12 | 120 |
| 11 | 4.3 | 400 | 200 | 21.0 | CPB | 65.0 | Pyridine | 13.0 | −45 | 120 |
| 12 | 4.3 | 400 | 200 | 21.0 | CPB | 32.0 | Pyridine | 13.0 | −48 | 120 |
| 13 | 4.3 | 600 | — | 21.0 | CPB | 32.0 | Pyridine | 13.0 | −30 | 120 |
| 14 | 3.2 | 200 | 200 | 40.0 | CPB | 100.0 | Pyridine | 38.0 | −33 | 120 |
| 15 | 4.3 | 600 | 400 | 21.0 | CPB | 100.0 | Pyridine | 127.0 | −64 | 120 |
| 16 | 4.3 | 300 | 300 | 21.0 | CPB | 100.0 | Pyridine | 88.0 | −65 | 120 |
| 17 | 4.3 | 300 | 300 | 26.0 | BCPB | 50.0 | Pyridine | 13.0 | −48 | 60 |
| 18 | 3.2 | 200 | 200 | 40.0 | CPB | 100.0 | Pyridine | 38.0 | −40 | 120 |
| 19 | 3.2 | 200 | 200 | 40.0 | CPB | 100.0 | — | — | −30 | 120 |
| 20 | 4.3 | 300 | 300 | 26.0 | $C_{16}$—Cl | 80.0 | Pyridine | 13.0 | −68 | 120 |
| 21 | 6.4 | 300 | 300 | 40.0 | CPB | 73.0 | Pyridine | 20.0 | −57 | 120 |
| 22 | 3.2 | 300 | — | 15.8 | CPB | 97.0 | Pyridine | 37.9 | | 0.5 |

CPB = 2-Chloro-2-propylbenzene
$C_{16}$—Cl = 1-Chloro-1,1,3,3,5,5,7,7-octakismethyloctane
BCPB = 4,6-(2-chloro-2-propyl)benzene
T(max) = Maximum polymerization temperature

TABLE 2

| Ex. | Yield [g] | GPC[1] $M_n$ | D |
|---|---|---|---|
| 5 | 183.0 | 3473 | 1.49 |
| 6 | 159.0 | 3295 | 2.54 |
| 7 | 232.0 | 3343 | 2.54 |
| 8 | 195.0 | 4067 | 1.50 |
| 9 | 171.5 | 1852 | 1.56 |
| 10 | 157.4 | 2243 | 1.76 |
| 11 | 223.8 | 3733 | 1.80 |
| 12 | 214.6 | 7787 | 1.28 |
| 13 | 171.9 | 7141 | 1.53 |
| 14 | 161.3 | 1937 | 1.57 |
| 15 | 22.8 | 1234 | 2.25 |
| 16 | 14.6 | 811 | 2.31 |
| 17 | 234.1 | 4463 | 1.34 |
| 18 | 164.5 | 1929 | 1.97 |
| 19 | 173.7 | 1981 | 2.97 |
| 20 | 248.7 | 3612 | 1.83 |
| 21 | 276.6 | 4565 | 2.18 |
| 22 | 119.0 | 1225 | 1.64 |

[1]GPC = Gel permeation chromatography

The polymers of examples 5 to 22 had a chlorine content of less than 0.1% by weight. The content of terminal double bonds was above 90 mol % in all polymers.

We claim:

1. A process for the preparation of polyisobutenes in which at least 80 mol % of the polymer chains have at least one olefinically unsaturated terminal group, by cationic polymerization of isobutene or isobutene-containing monomer mixtures in the condensed phase, wherein the polymerization is carried out in the presence of an initiator system comprising i) a Lewis acid selected from titanium(IV)chloride and boron-trichloride and ii) at least one organic compound I having at least one functional group of the formula FG

(FG)

where

X is selected from halogen, $C_1$-$C_6$-alkoxy and $C_1$-$C_6$-acyloxy, $R^1$ is hydrogen or methyl and $R^2$ is methyl or forms a $C_5$- or $C_6$-cycloalkyl ring together with $R^1$ or with the moiety to which the functional group FG is bonded, and $R^2$ may also be hydrogen if the functional group FG is bonded to an aromatic or olefinically unsaturated carbon atom, which forms a carbocation or a cationic complex under, the polymerization conditions, the organic compound I being selected from compounds of the formulae I-A to I-D:

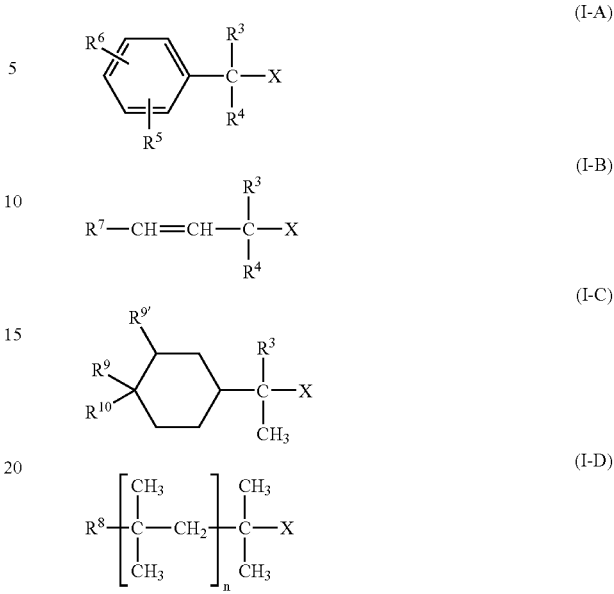

where X has the abovementioned meanings, n is 1, 2, 3, 4 or 5, $R^3$, $R^4$ and $R^{10}$, independently of one another, are each hydrogen or methyl, $R^5$, $R^6$ and $R^7$, independently of one another, are each hydrogen, $C_1$-$C_4$-alkyl or a group $CR^3R^4$—X, where $R^3$, $R^4$ and X have the abovementioned meanings, and $R^8$ is hydrogen, methyl or a group X and $R^9$ and $R^{9'}$ are each hydrogen or a group X, in a solvent inert toward the Lewis acid, the Lewis acid being used in less than the stoichiometric amount, based on the functional groups FG of the compound I.

2. A process as claimed in claim 1, wherein the compound I is used in an amount of from $10^{-5}$ to $10^{-1}$ mol, based on the functional groups FG of the compound I, per mole of isobutene.

3. A process as claimed in claim 1, wherein the concentration of the Lewis acid in the reaction batch is from 0.01 to 0.3 mol/l.

4. A process as claimed in claim 1, wherein the initiator system additionally comprises at least one aprotic polar compound II which is suitable for complex formation with the Lewis acid or with the carbocation or cationic complex of Lewis acid and compound I, which carbocation or cationic complex is formed under the reaction conditions.

5. A process as claimed in claim 4, wherein the compound II is selected from pyridine and alkylpyridines.

6. A process as claimed in claim 4, wherein the compound II and the compound I are used in a molar ratio of from 10:1 to 1:20, based on the functional groups FG of the compound I.

7. A process as claimed in claim 1, wherein the polymerization is carried out at below 0° C.

8. A process as claimed in claim 7, wherein the polymerization is carried out of a temperature ranging from −30 to −120° C.

9. A process as claimed in claim 8, wherein the polymerization is carried out of a temperature ranging from −40 to −110° C.

10. A process as claimed in claim 1, wherein the solvent is selected from aliphatic and cycloaliphatic hydrocarbons and inert halohydrocarbons.

11. A process as claimed in claim 1, wherein the polymerization is stopped by adding a protic compound.

12. A process as claimed in claim 1, wherein the solvent is removed at temperatures of at least 150° C. in order to obtain the polyisobutenes.

13. A process as claimed in claim 1, wherein the organic compound I is of the formula I-C

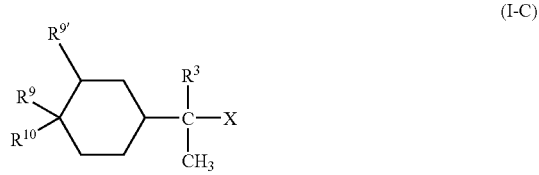

(I-C)

where X, $R^3$, $R^9$ and $R^{10}$ have the abovementioned meanings.

14. A process as claimed in claim 13, for the cationic polymerization of isobutene or isobutene-containing monomer mixtures or for the block copolymerization of isobutene with vinylaromatic monomers.

15. A process as claimed in claim 1, for the preparation of polyisobutenes in which at least 90 mol % of the polymer chain have at least one olefinically unsaturated terminal group.

16. A process as claimed in claim 1, for the preparation of polyisobutenes in which at least 95 mol % of the polymer chains have at least one olefinically unsaturated terminal group.

17. A process as claimed in claim 1, wherein the organic compound I is of the formula I-B or I-C.

* * * * *

UNITED STATES PATENT AND TRADEMARK OFFICE
CERTIFICATE OF CORRECTION

| | | |
|---|---|---|
| PATENT NO. | : 7,244,870 B2 | Page 1 of 1 |
| APPLICATION NO. | : 10/433439 | |
| DATED | : July 17, 2007 | |
| INVENTOR(S) | : Lange et al. | |

It is certified that error appears in the above-identified patent and that said Letters Patent is hereby corrected as shown below:

In Claim 8, col. 14, indicated line 63:
"carried out of a temperature" should read --carried out at a temperature--

In Claim 9, col. 14, indicated line 66:
"carried out of a temperature" should read --carried out at a temperature--

Signed and Sealed this

Twenty-first Day of August, 2007

JON W. DUDAS
*Director of the United States Patent and Trademark Office*